United States Patent [19]
Huang

[11] 3,780,952
[45] Dec. 25, 1973

[54] TENSION BRAZED FACE INJECTOR

[75] Inventor: David H. Huang, Woodland Hills, Calif.

[73] Assignee: The United States of America as represented by the Secretary of the United States Air Force, Washington, D.C.

[22] Filed: May 17, 1972

[21] Appl. No.: 254,140

[52] U.S. Cl................. 239/424.5, 60/258, 239/549
[51] Int. Cl............................................. F02m 55/00
[58] Field of Search....................... 60/39.74 A, 258; 239/418, 425, 424.5, 553.5, 555, 560, 543, 548, 549, 558

[56] References Cited
UNITED STATES PATENTS
3,115,009 12/1963 Ledwith et al...................... 239/549
3,474,971 10/1969 Goodrich............................ 239/558

*Primary Examiner*—Lloyd L. King
*Assistant Examiner*—A. Kashnikow
*Attorney*—Harry A. Herbert, Jr. et al.

[57] ABSTRACT

An injector for a liquid propellant rocket engine and a method of manufacturing the injector. The injector comprises a body structure portion of high strength, lightweight alloy to which is tension brazed a faceplate portion of nickel at each of the joints formed at the body structure-faceplate interface. Each brazed joint is divided by a purge groove. The interface as a whole, and the plurality of brazed joints, may be considered to be basically a flat-face brazed joint with its principal workload in tension. As a result of the segmented construction of the injector, and because of the purge grooves therein, the structural soundness of each brazed joint can be statically tested and definitely ascertained, prior to actual use of the injector, by pressurizing the purge grooves, and noting if there is any drop in the pressure. Additionally, premature contact by the liquid propellant constituents (e.g., fuel and oxidizer), because of leakage between propellant manifolds in the injector while the injector is in use, in flight or otherwse, is prevented by introducing an inert (i.e., non-reactive) gas pressurant, such as nitrogen, into the purge grooves at a pressure which is higher than the propellant constituents. Further, the method of manufacture permits the simple, reliable, low cost, and relatively rapid fabrication of the injector.

3 Claims, 2 Drawing Figures

TENSION BRAZED FACE INJECTOR

BACKGROUND OF THE INVENTION

This invention relates to a liquid propellant rocket engine and, more particularly, to the injector thereof and therein.

The phrase "liquid propellant," as used herein, is intended to mean a bipropellant (i.e., where the liquid fuel and liquid oxidizer are kept physically separated until they are injected into the combustion chamber of the rocket engine) which, in turn, may include a catalytic agent and/or inert additive(s).

The term "injector," as used herein, is intended to mean what is also sometimes referred to in the art as the "injector head," and is not intended to include the propellant sources, the conduits leading from the sources to the injector, the valves and/or regulators disposed at the propellant sources and/or in the conduits and/or at or near the injector, the igniter, and the like.

The term "inert," as used herein in conjunction with the words "gas," or "fluid," or "pressurant," or any combination thereof, is intended to mean that the gas, or fluid, or pressurant, whether an element, or a mixture, or a compound, does not react (i.e., is non-reactive) with any of the bipropellant constituents.

The function of an injector in the liquid propellant rocket engine operation is similar to the function of a carburator in the well known internal combustion engine. Succintly, the injector introduces and meters the flow of the propellant constituents (e.g., the liquid fuel and the liquid oxidizer) to and into the combustion chamber section of the thrust chamber and, thereby, the propellants come in contact, and/or are properly mixed, for satisfactory combustion.

Injectors of and for liquid propellant rocket engines are conventionally formed, by suitable means such as casting or forging, in one unit from a single stock of workpiece of art-accepted material which is satisfactory for the use intended. In these basic one-piece injectors it is necessary to form in the single stock, by suitable means such as drilling, the fuel inlet, the fuel inlet manifolds, the fuel inlet manifold passages, the fuel distribution manifolds, the fuel injection orifices, the oxidizer inlet, the oxidizer inlet manifold, the oxidizer inlet manifold passages, the oxidizer distribution manifolds, the oxidizer injection orifices, and/or other needed or desired apertures, channels, conduits, and the like. In essence, the manufacture of these conventional one-piece injectors, and particularly the forming of the openings in and through these one-piece injectors, is time-consuming, complex, and costly, primarily because of the original and basic one-piece structure of the injectors. If an injector could be manufactured in segments (i.e., separate elements, components, parts, portions, or the like), the manufacture thereof (and the formation of the openings therein and therethrough) would be relatively rapid, more simple, and less costly.

The formation of the injector per se in segments, and the subsequent necessary joining of these segments (by, for example, welding), has been avoided and is considerably highly undesirable, because: firstly, there is no known, presently available method of testing the soundness or integrity of the joints formed by joining the segments, prior to the actual use of the liquid propellant constituents in the injector; and, secondly and of controlling importance, if in fact there is leakage between the joints, the resultant premature contact or mixing of the liquid propellant constituents in the injector will result in extensive damage to, or destruction of, the injector, the thrust chamber with its combustion chamber, and of the rocket engine itself. The seriousness of this type of a situation can be easily appreciated if one imagines a rocket, powered by a liquid propellant rocket engine, which is enroute to a designated target, and there is premature contact or mixing of the liquid propellant constituents within the injector. The undesired and unfortunate result is the unintended burnout and destruction of the injector, the thrust chamber and its combustion chamber, the rocket engine, and the rocket, and the consequent failure of the assigned mission.

There is, therefore, a genuine need for a method of manufacturing an injector for a liquid propellant rocket engine relatively rapidly, simply, and at low cost. Also, if in fact the injector is to be manufactured in segments (i.e., separate elements, components, parts, portions, or the like), which method would of itself be novel, then the joining of the segments must be reliable (i.e., without possible leakage at the joints) and the structure of the injector must permit the safe and easy testing of the joints for leakage prior to in-flight use of the injector.

My invention fulfills the aforementioned need, eliminates the present inabilities, and, in addition, prevents the in-flight premature mixing or contact of the liquid propellant constituents within the injector. My invention truly constitutes a significant advance in the state-of-the-art.

SUMMARY OF THE INVENTION

This invention pertains to an injector of and for a liquid propellant rocket engine and, in addition, to a method of manufacturing said injector.

Therefore, an object of this invention is to provide a novel, reliable, multi-portion injector of and for a liquid propellant rocket engine.

Another object of this invention is to provide a novel method of manufacturing my injector relatively rapidly, simply, and at low cost.

Still another object of this invention is to permit the safe and easy testing of the joints of my multi-portion injector for leakage from the joints, prior to in-flight use of the injector.

A further object of this invention is to permit the premature mixing or contact, in-flight or otherwise, of the liquid propellant constituents within my injector.

These objects, and still other related and equally important objects, of my invention will become readily apparent after a consideration of the description of the invention and reference to the drawings.

DESCRIPTION OF THE PREFERRED EMBODIMENT

Figure 1:
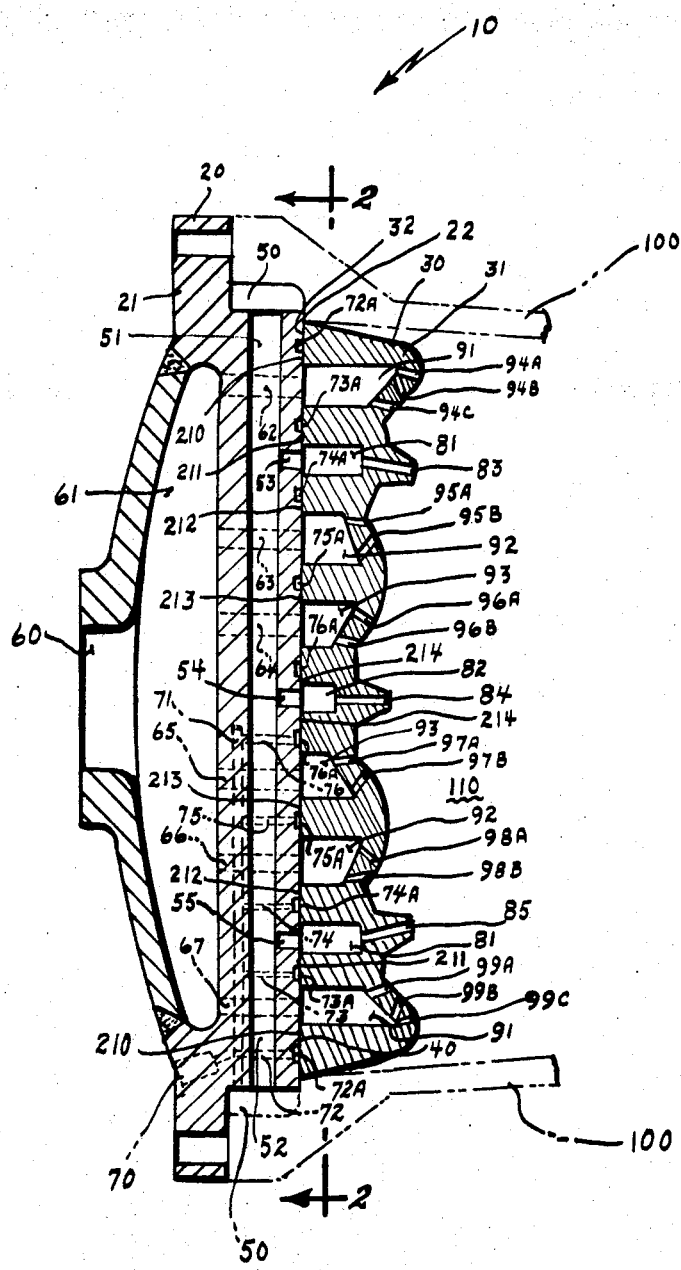
FIG. 1 is a side elevation view, in cross-section and in simplified schematic form, of a preferred embodiment of the apparatus portion of my invention, showin in phantom the connection and the relative position of my preferred embodiment to a thrust chamber, which is partially fragmented, and to the combustion chamber thereof.

With reference to FIG. 1, therein is shown a side elevation view, in cross-section and in simplified schematic form, of a preferred embodiment 10 of the apparatus portion of my invention. The preferred embodiment comprises, in essence, injector body structure portion or component 20 (also often referred to in the art as the injector "body") with external surface 21 and with internal surface 22, and injector faceplate portion or component 30 (also often referred to in the art as the injector "face") with external surface 31 and internal surface 32. Faceplate portion 30 is fixedly joined, preferably by tension brazing, to body structure portion 20, in a particular positional relationship which will be described later herein, to form a unitary integrated injector, such as 10, with interface 40.

Also shown in FIG. 1, in phantom, is the connection to, and relative position of, the preferred embodiment of my injector 10 to a thrust chamber 100 and combustion chamber 110 thereof.

Still with reference to FIG. 1, body structure portion 20 is of one piece high strength, lightweight alloy, and has therein a fuel inlet 50 in communication with a plurality of fuel inlet manifolds, such as 51 and 52, which are in communication with a plurality of fuel inlet manifold passages, such as 53, 54 and 55, which lead to the internal surface 22 of injector body structure portion 20.

Body structure portion 20 also has therein an oxidizer inlet 60 in communication with an oxidizer inlet manifold 61 which is in communication with a plurality of oxidizer inlet manifold passages, such as 62–67, inclusive, which lead to the internal surface 22 of injector body structure portion 20.

Body structure portion 20 further has therein a purge grooves pressurization pressurant inlet port 70 in communication with a purge groove pressurant inlet manifold 71 which is in communication with a plurality of purge groove pressurant inlet manifold passages, such as 72–76, inclusive, with each of the plurality of purge groove pressurant inlet manifold passages, such as 72, operatively connected to a corresponding purge groove, such as 72A, of a plurality of purge grooves, such as 72A, 73A, 74A, 75A, and 76A, which are on the internal surface 22 of the body structure portion 20.

Again with reference to FIG. 1, therein is shown faceplate portion 30 of the preferred embodiment 10 of my inventive injector. Faceplate 30 is made of material of good thermal conductivity with attendant strength, such as nickel or copper-silver alloy. The faceplate 30 is made of one piece, preferably by forging, and has external surface 31 which is exposed to combustion chamber 110 of thrust chamber 100, and has internal surface 32 which, as will be described later, abuts with and is fixedly joined to internal surface 22 of body structure portion 20.

Faceplate portion 30 has therein a plurality of fuel distribution manifolds, such as 81 and 82, which, in turn, have at least one fuel injection orifice, such as 83 or 84 or 85, extending from each fuel distribution manifold, such as 81 and 82, to the external surface 31 of faceplate portion 30 and into combustion chamber 110 of thrust chamber 100.

Faceplate portion 30 also has therein a plurality of oxidizer distribution manifolds, such as 91, 92 and 93, which in turn, have at least one oxidizer injection orifice, such as 94A, extending from each oxidizer distribution manifold, such as 91, to the external surface 31 of faceplate portion 30 and into combustion chamber 110 of thrust chamber 100. Also shown are: oxidizer injection orifices 94B, 94C, and 95A, 95B, and 96A, 96B, for, respectively, oxidizer distribution manifolds 91, and 92, and 93; and oxidizer injection orifices 97A, 97B, and 98A, 98B, and 99A, 99B, 99C for, respectively, oxidizer distribution manifolds 93, and 92, and 91.

The internal surface 32 of faceplate portion 30 is positioned relative to, abutting with, and fixedly joined, preferably by tension brazing, to internal surface 22 of body structure portion 20, thereby forming a unitary integrated injector 10 having an injector body structure (20)- faceplate (30) interface 40 with a plurality of brazed joints, such as 210, 211, 212, 213 and 214, thereat, such that: the brazed joints have a principal workload and said principal workload of the brazed joints, such as 210-214, inclusive, at the injector body structure (20)- faceplate (30) interface 40 is in tension; a different purge groove, such as 72A, is located at each brazed joint, such as 210; each, such as 53, of the plurality of fuel inlet manifold passages operatively connects a corresponding fuel distribution manifold, such as 81, of the plurality of said manifolds, with a fuel inlet manifold, such as 51; and each, such as 62, of the plurality of oxidizer inlet manifold passages operatively connects a corresponding oxidizer distribution manifold, such as 91, of the plurality of said manifolds, with the oxidizer inlet manifold 61.

It is readily apparent from the above-described joining of faceplate 30 to body structure 20 that the interface 40 as a whole, and the plurality of brazed joints 210-214, inclusive, may be considered to be basically and essentially a (i.e., one) flat-face tension brazed joint.

Figure 2:
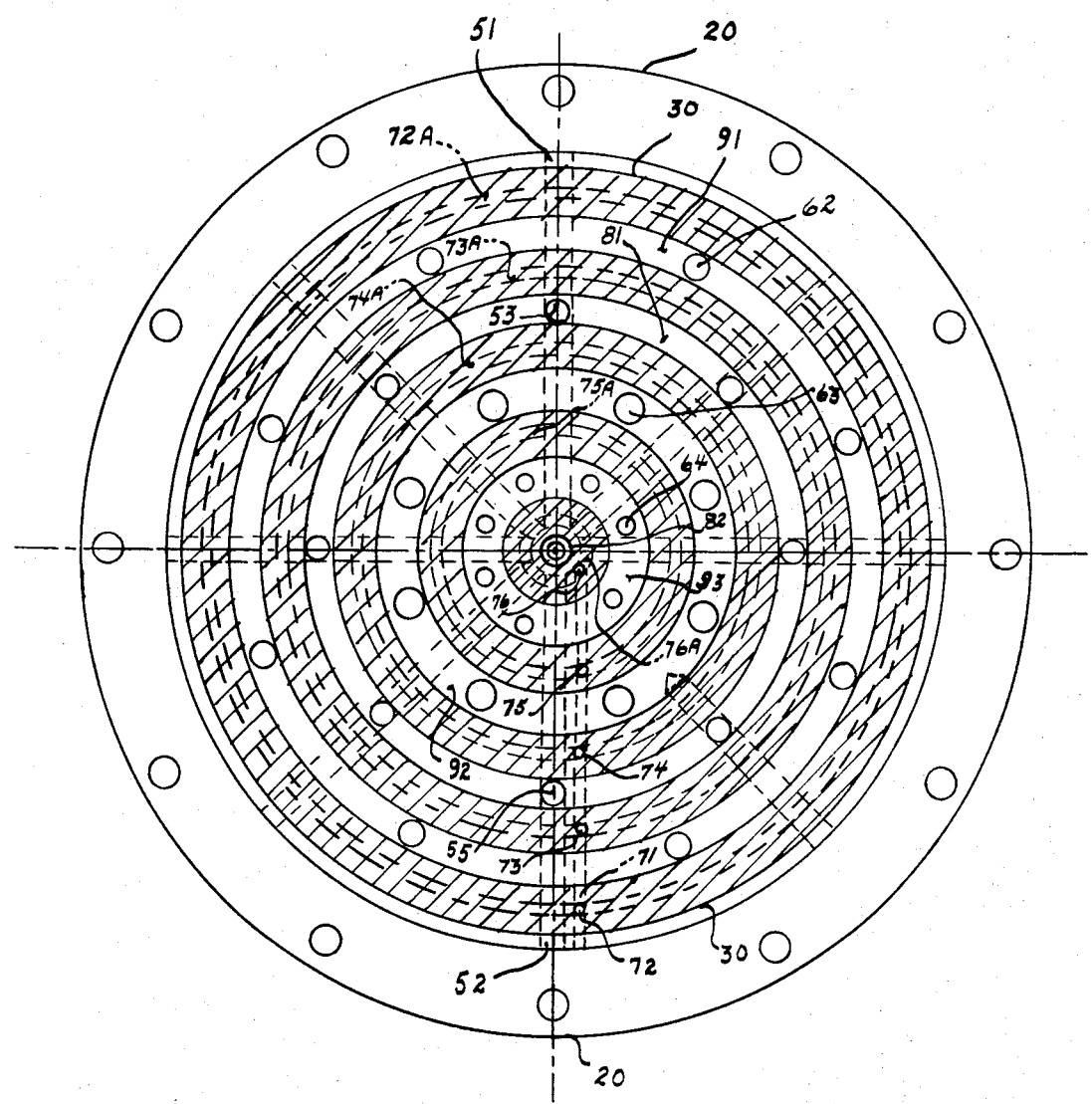
FIG. 2 is a top plan view, in cross-section and in simplified schematic form, of my preferred embodiment, taken along line 2-2 of FIG. 1.

With reference to FIG. 2, therein is shown a top plan view, in cross-section and in simplified schematic form, of a preferred embodiment 10 of my injector, taken along line 2—2 of FIG. 1. In the interest of not encumbering FIG. 2, only selective features of my preferred embodiment 10, which is shown in FIG. 1, are shown in FIG. 2 and, of course these features (i.e., injector portions, inlets, manifolds, passages, grooves, orifices, and the like) have the same reference numerals as in FIG. 1.

Shown in FIG. 2, among other features, are: injector body structure portion 20; faceplate portion 30; representative fuel inlet manifolds 51 and 52 of a plurality of fuel inlet manifolds; representative fuel inlet manifold passages 53 and 54 of a plurality of fuel inlet manifold passages; representative oxidizer inlet manifold passages 62, 63 and 64 of a plurality of oxidizer inlet manifold passages; purge grooves pressurant inlet manifold 71; purge groove pressurant inlet manifold passages 72, 73, 74, 75 and 76; annular purge grooves 72A, 73A, 74A, 75A and 76A; fuel distribution manifolds 81 and 82; and oxidizer distribution manifolds 91, 92 and 93.

Since the relative position, and where applicable the operative interconnection and communication, of these features has been described already in describing preferred embodiment 10 as shown in FIG. 2, it is be-

DESCRIPTION OF THE INVENTIVE METHOD

With regard to my inventive method of manufacturing my injector 10 of, and for use with, a liquid propellant rocket engine, the method comprises essentially four steps which inferentially already have been set forth in part hereinabove, and the results of the practicing the steps of my method are shown in FIGS. 1 and 2.

The first step is fabricating an injector body structure portion 20 from a high strength, lightweight alloy, with body structure portion 20 having an external surface 21 and an internal surface 22, and with body structure portion 20 having therein: a fuel inlet 50 in communication with a plurality of fuel inlet manifolds, such as 51 and 52, which are in communication with a fuel inlet manifold passages, such as 53, 54 and 55, which lead to the internal surface 22 of injector body structure portion 20; an oxidizer inlet 60 in communication with an oxidizer inlet manifold 61 which is in communication with a plurality of oxidizer inlet manifold passages, such as 62–67, inclusive, which lead to the internal surface 22 of injector body structure portion 20; and a purge grooves pressurization pressurant inlet port 70 in communication with a purge groove pressurant inlet manifold 71 which is in communication with a plurality of purge groove pressurant inlet manifold passages, such as 72–76, inclusive, with each of the plurality of purge groove pressurant inlet manifold passages, such as 72, operatively connected to a corresponding purge groove such as 72A, of a plurality of purge grooves, such as 72A, 73A, 74A, 75A, and 76A, which are on the internal surface 22 of the body structure portion 20.

The second step is fabricating, preferably by forging, a one piece faceplate portion 30 from material of good thermal conductivity with attendant strength, such as nickel or copper-silver alloy, with an external surface 31 which is to be exposed to the combustion chamber 110 of the thrust chamber 100 to which the injector is to be attached, and which has an internal surface 32 which is to abut with and is to be fixedly joined to internal surface 22 of body structure portion 20. The faceplate portion 30 is fabricated to have therein, and has therein: a plurality of fuel distribution manifolds, such as 81 and 82, which, in turn, have at least one fuel injection orifice, such as 83 or 84 or 85, extending from each fuel distribution manifold, such as 81 and 82, to the external surface 31 (i.e., at the combustion chamber 110 side) of faceplate portion 30; and a plurality of oxidizer distribution manifolds, such as 91, 92 and 93, which, in turn, have at least one oxidizer injection orifice, such as 94A, extending from each oxidizer distribution manifold, such as 91, to the external surface (i.e., at the combustion chamber 110 side) of faceplate portion 30.

The third step is positioning the injector body structure portion 20, fabricated in and by the first step, and the faceplate portion 30, fabricated in and by the second step, in relation to each other, such that: the internal surface 32 of the faceplate portion 30 abuts with the internal surface 22 of the injector body structure portion; an injector body structure portion (20)- faceplate portion (30) interface 40 is formed with a plurality of joints, such as 210, 211, 212, 213 and 214, thereat; a different purge groove, such as 72A, of the plurality of purge grooves is located at each of said joints, such as 210; each, such as 53, of the plurality of fuel inlet manifold passages, operatively connects a corresponding fuel distribution manifold, such as 81, of the plurality said manifolds, with a fuel inlet manifold, such as 51; and, each, such as 62, of the plurality of oxidizer inlet manifold passages operatively connects a corresponding oxidizer distribution manifold, such as 91, of the plurality of said manifolds, with the oxidizer inlet manifold 61.

The fourth, and last, step of my method which results in the forming of the injector is fixedly joining, preferably by tension brazing joints 210–214, inclusive, the injector body structure portion 20 to the faceplate portion 30 in the aforesaid position (i.e., step 3, above), such that the plurality of joints 210–214, inclusive, at the injector body structure (20) — faceplate (30) interface 40 have a principal workload and said workload is in tension.

MODE OF OPERATION OF THE PREFERRED EMBODIMENT

After my preferred embodiment 10 of an injector of, and for use with, a liquid propellant rocket engine is manufactured by my method, as set out above, the injector 10 operates, and is used in a liquid propellant rocket engine, in the same way or manner as a conventional injector. A description of such operation is not believed necessary here, except to reiterate that the function of an injector in the liquid propellant rocket engine is similar to the function of a carburetor in the well known internal combustion engine, i.e., the injector introduces and meters the flow of the propellant constituents (e.g., the liquid fuel and the liquid oxidizer) to and into the combustion chamber section 110 of the thrust chamber 100 and, thereby, the propellants come in contact, and/or are properly mixed, for satisfactory combustion. More specifically, the propellant constituents (i.e., the liquid fuel and the liquid oxidizer) flow, at the appropriate time, from their respective sources (not shown) to the injector 10, to and through their respective inlets (50, 60), into and through their inlet manifolds (51, 52 and 61), through their inlet manifold passages (53-55, inclusive, and 62-67, inclusive), into and through their distribution manifolds (81, 82, 91-93, inclusive), through their distribution manifold orifices (83–85, inclusive, and such as 94A, 94B, and 94C), and into combustion chamber 110 of thrust chamber 100.

However, the performance of, and the results obtained by the use of my injector 10, are new, useful, unexpected and unobvious. For example, the structure of my injector 10 permits the safe and easy testing of the joints of my multi-portion injector 10 for leakage from the joints, such as 210–214, inclusive, with such testing being heretofore not attainable in the art. More specifically, the structural soundness of each joint, such as 210–214, inclusive, can be statically tested and definitely ascertained prior to actual use of injector 10 simply by pressurizing each purge groove, such as 72A–76A, inclusive, with a suitable pressurant to an appropriate pressure level to simulate the tension workload and noting if there is any drop in the pressure. If there is no drop, there is no leakage. Conversely, if there is a drop, there is leakage. Additionally, and as important, is the fact that the structure of my injector 10 prevents the premature mixing or contact, in flight or otherwise, of the liquid propellant constituents (e.g., liquid fuel and liquid oxidizer) within my injector, another feat not previously attainable in the art. This premature contact is prevented simply by introducing an inert pressurant, preferably nitrogen gas, during the injector operation into the purge grooves, such as 72A–76A, inclusive, at a pressure which is higher than that of the propellant constituents.

Further, by the use of my method of manufacturing an injector, new useful, unexpected, and unobvious results are attained. For example, it results in a novel, reliable, multi-portion (i.e., injector body structure portion 20 and faceplate portion 30) injector of and for a liquid propellant rocket engine. Additionally, my novel method permits the manufacture of an injector relatively rapidly, simply, and at low cost, when compared with known prior art injector manufacturing methods.

While there have been shown and described the fundamental features of my invention, as applied to a particular and preferred embodiment and as applied to a method of manufacture, it is to be understood that various substitutions and omissions may be made by those of ordinary skill in the art without departing from the spirit of the invention.

What is claimed is:

1. An injector for use with a liquid propellant rocket engine, wherein said liquid propellant rocket engine has a thrust chamber which includes a combustion chamber, comprising:
   a. an injector body structure portion made of material of a high strength, lightweight alloy, with said injector body structure portion having an internal surface and an external surface, and with said injector body structure portion having therein:
      1. a fuel inlet in communication with a plurality of fuel inlet manifolds which are in communication with a plurality of fuel inlet manifold passages which lead to said internal surfaces of said injector body structure portion;
      2. an oxidizer inlet in communication with an oxidizer inlet manifold which is in communication with a plurality of oxidizer inlet manifold passages which lead to said internal surface of said injector body structure portion;
      3. and, a purge grooves pressurization pressurant inlet port in communication with a purge groove pressurant inlet manifold which is in communication with a plurality of purge groove pressurant inlet manifold passages, with each of the plurality of purge groove pressurant inlet manifold passages operatively connected to a corresponding purge groove of a plurality of purge grooves which are on the internal surface of said injector body structure portion;
   b. and, a faceplate portion made of material of good thermal conductivity with attendant strength and having an internal surface and an external surface, with said faceplate portion having therein, and on the internal surface thereof:
      1. a plurality of fuel distribution manifolds having at least one fuel injection orifice extending from each fuel distribution manifold to the external surface of said faceplate portion and into said combustion chamber of said thrust chamber of the liquid propellant rocket engine;
      2. and, a plurality of oxidizer distribution manifolds having at least one oxidizer injection orifice extending from each oxidizer distribution manifold to the external surface of said faceplate portion and into said combustion chamber of said thrust chamber of the liquid propellant rocket engine;
      and, with the internal surface of said faceplate portion positioned relative to, and abutting with, and fixedly joined to the internal surface of said injector body structure portion by brazing, thereby forming a unitary integrated injector having an injector body structure-faceplate interface with a plurality of brazed joints thereat, such that: said brazed joints at the injector body structure-faceplate interface have a principal workload and said principal workload is in tension; a different purge groove is located at each brazed joint; each of the plurality of fuel inlet manifold passages operatively connects a corresponding fuel distribution manifold, of the plurality of said manifolds, with a fuel inlet manifold; and each of the plurality of oxidizer inlet manifold passages operatively connects a corresponding oxidizer distribution manifold, of the plurality of said manifolds, with the oxidizer inlet manifold.

2. An injector, as set forth in claim 1, wherein said faceplate portion is made of nickel.

3. An injector, as set forth in claim 1, wherein said faceplate portion is made of copper-silver alloy.

* * * * *